(12) United States Patent
Toyama et al.

(10) Patent No.: US 6,291,945 B1
(45) Date of Patent: Sep. 18, 2001

(54) DISCHARGE LAMP LIGHTING DEVICE

(75) Inventors: Koichi Toyama, Kariya; Koichi Kato, Chiryu; Kenji Aida, Kariya, all of (JP)

(73) Assignee: Nippondenso Co., Ltd., Kariya (JP)

( * ) Notice: Subject to any disclaimer, the term of this patent is extended or adjusted under 35 U.S.C. 154(b) by 531 days.

(21) Appl. No.: 08/670,123

(22) Filed: Jun. 25, 1996

(30) Foreign Application Priority Data

Jun. 29, 1995 (JP) .................................................... 7-164063
Dec. 7, 1995 (JP) .................................................... 7-319157

(51) Int. Cl.[7] .................................................. H05B 37/02
(52) U.S. Cl. ...................... 315/307; 315/209 R; 315/224; 315/82; 315/DIG. 7; 315/DIG. 2
(58) Field of Search ............................... 315/DIG. 7, 307, 315/82, DIG. 2, 209 R, 224

(56) References Cited

U.S. PATENT DOCUMENTS 5,319,286 * 6/1994 Leyten .................................. 315/307
5,365,152   11/1994 Ozawa et al. ......................... 315/291
5,486,740 * 1/1996 Yamashita et al. ............. 315/DIG. 7

FOREIGN PATENT DOCUMENTS 5-144577   6/1993 (JP) .

* cited by examiner

Primary Examiner—Michael B. Shingleton
(74) Attorney, Agent, or Firm—Pillsbury Winthrop LLP

(57) ABSTRACT

A lighting device for a discharge lamp includes a power supplying circuit for supplying electric power to the discharge lamp. A current sensing circuit is operative for sensing a lamp current which flows through the discharge lamp. A control circuit is operative for enabling the power supplying circuit to supply one of a direct-current electric power and a low-frequency electric power to the discharge lamp during a time interval in start of the discharge lamp. The control circuit is also operative for adjusting a duration time of supply of a one-polarity electric power to the discharge lamp in accordance with a magnitude of the lamp current sensed by the current sensing circuit. Further, the control circuit is operative for enabling the power supplying circuit to supply an alternating-current electric power to the discharge lamp after the time interval elapses.

10 Claims, 8 Drawing Sheets

DISCHARGE LAMP LIGHTING DEVICE

BACKGROUND OF THE INVENTION

1. Field of the Invention

This invention relates to a lighting device or a starting device for a high-voltage discharge lamp such as a metal halide lamp. Here, the lighting device or the starting device is of the type using an alternating current (AC) or a rectangular-wave current.

2. Description of the Prior Art

It is known to light or start a high-voltage discharge lamp such as a metal halide lamp by using an alternating current (AC). In the case where such a discharge lamp in a cold state is started, the intensity of light generated by the discharge lamp remains low until the pressure of a metal vapor therein rises to a sufficient level.

Japanese published unexamined patent application 5-144577 corresponding to U.S. Pat. No. 5,365,152 discloses a discharge-lamp lighting apparatus including a lighting control circuit. During a time of starting the discharge lamp, the lighting control circuit serves to control its output in response to a length of the last off-time and an on-time after the start of discharging. In the discharge-lamp lighting apparatus of Japanese application 5-144577, a power supplied to the discharge lamp is controlled in response to the output of the lighting control circuit.

Some of the prior-art AC-based lighting devices for high-voltage discharge lamps have a problem as follows. Immediately after a high-voltage discharge lamp in a cold state is started by using AC power, the discharge lamp tends to go out upon a change of the polarity or direction of a lamp current between a positive side and a negative side.

SUMMARY OF THE INVENTION

It is a first object of this invention to provide a discharge-lamp lighting device which prevents a discharge lamp, being low in electrode temperature, from going out immediately after the discharge lamp is started.

It is a second object of this invention to provide a discharge-lamp lighting device having two advantageous functions as follows. The first advantageous function is to prevent a discharge lamp, being low in electrode temperature, from going out immediately after the discharge lamp is started. The second advantageous function is to prevent one of the discharge-lamp electrodes from diminishing in size even in the case where every starting of the discharge lamp uses a direct-current (DC) power or a low-frequency power.

A first aspect of this invention provides a lighting device for a discharge lamp which comprises a power supplying circuit for supplying electric power to the discharge lamp; a current detecting circuit for detecting a lamp current which flows through the discharge lamp; and a control circuit for enabling the power supplying circuit to supply one of a direct-current electric power and a low-frequency electric power to the discharge lamp during a time interval in starting the discharge lamp, for adjusting a duration time of supply of a one-polarity electric power to the discharge lamp in accordance with a magnitude of the lamp current detected by the current detecting circuit, and for enabling the power supplying circuit to supply an alternating-current electric power to the discharge lamp after the time interval elapses.

A second aspect of this invention is based on the first aspect thereof, and provides a lighting device wherein the control circuit is operative for adjusting the duration time of supply of the one-polarity electric power to the discharge lamp in accordance with a value of integration of the lamp current.

A third aspect of this invention is based on the second aspect thereof, and provides a lighting device wherein the control circuit is operative for, in cases where the low-frequency electric power is supplied to the discharge lamp, adjusting a ratio between portions of the time interval which correspond to a positive-current flow time and a negative-current flow time respectively so that the value of integration of the lamp current in a positive side and the value of integration of the lamp current in a negative side are approximately equal to each other.

A fourth aspect of this invention is based on the second aspect thereof, and provides a lighting device wherein the control circuit includes a capacitor, and a current controlling circuit for charging and discharging the capacitor with currents depending on the lamp current.

A fifth aspect of this invention is based on the second aspect thereof, and provides a lighting device wherein the control circuit includes a capacitor, a current controlling circuit for charging and discharging the capacitor with charging and discharging currents depending on the lamp current during the time interval, and a current increasing circuit for increasing the charging and discharging currents after the time interval elapses.

A sixth aspect of this invention is based on the first aspect thereof, and provides a lighting device wherein the control circuit includes a lamp current increasing circuit for increasing the lamp current during a predetermined time in the start of the discharge lamp.

A seventh aspect of this invention provides a lighting device for a discharge lamp which comprises a starting switch movable into an on position; first means for sensing a lamp current which flows through the discharge lamp; second means connected to the starting switch for alternately feeding a positive-direction current and a negative-direction current to the discharge lamp after the starting switch moves into the on position; and third means connected to the first means and the third means for controlling a time length of continuous feed of each of the positive-direction current and the negative-direction current to the discharge lamp by the second means in response to the lamp current sensed by the first means.

An eighth aspect of this invention is based on the seventh aspect thereof, and provides a lighting device further comprising fourth means connected to the second means for enabling a time length of a first cycle of alternate feed of the positive-direction current and the negative-direction current to be longer than a time length of each of a second cycle and later cycles of alternate feed of the positive-direction current and the negative-direction current.

A ninth aspect of this invention provides a lighting device for a discharge lamp which comprises a starting switch movable into an on position; first means connected to the starting switch for feeding an alternating current of a variable frequency to the discharge lamp after the starting switch moves into the on position; and second means connected to the first means for increasing the frequency of the alternating current in accordance with lapse of time.

A tenth aspect of this invention is based on the ninth aspect thereof, and provides a lighting device further comprising third means for sensing a lamp current which flows through the discharge lamp, and fourth means connected to the first means and the third means for controlling the frequency of the alternating current in response to the lamp current sensed by the third means.

DESCRIPTION OF THE PREFERRED EMBODIMENTS

First Embodiment

Figure 1:
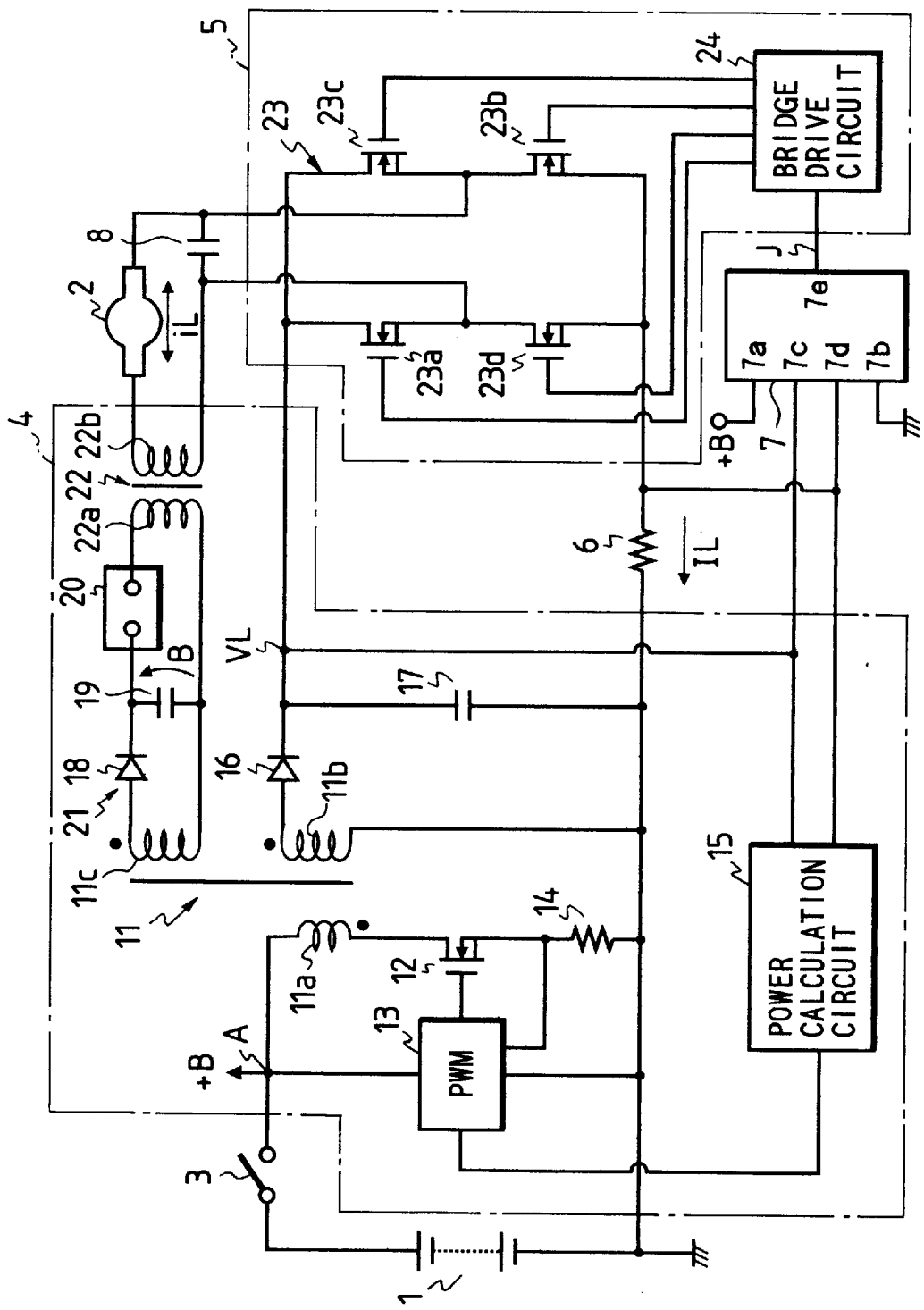
FIG. 1 is a diagram of a discharge-lamp lighting device according to a first embodiment of this invention.

FIG. 1 shows a discharge-lamp lighting device according to a first embodiment of this invention which operates on a high-voltage discharge lamp 2. An example of the discharge lamp 2 is a metal halide lamp. In this embodiment, the discharge lamp 2 is used as a headlight of a vehicle.

The discharge-lamp lighting device of FIG. 1 includes a battery 1. In this embodiment, the battery 1 is a vehicle battery. The discharge-lamp lighting device of FIG. 1 also includes a lighting switch or a starting switch 3, a direct-current (DC) power supply circuit 4, an inverter circuit 5, a current sensing resistor 6, a bridge control circuit 7, and a capacitor 8. The current sensing resistor 6 serves as a current sensing means. The bridge control circuit 7 includes an oscillation circuit and a controlling means. The capacitor 8 protects an H bridge circuit from high-voltage pulses during start of the discharge lamp 2. The H bridge circuit will be described later.

(1) DC Power Supply Circuit 4

The DC power supply circuit 4 includes a flyback transformer 11 having a primary winding 11a and two secondary windings 11b and 11c. The primary winding 11a is located in a side corresponding to the vehicle battery 1. The secondary windings 11b and 11c are located in a side corresponding to the discharge lamp 2. The primary winding 11a of the flyback transformer 11, the starting switch 3, the vehicle battery 1, a resistor 14, and a power MOS transistor 12 are connected in a closed loop.

A primary current through the flyback transformer 11, that is, a current through the primary winding 11a of the flyback transformer 11, is controlled by the power MOS transistor 12. The power MOS transistor 12 executes a switching process which is controlled by a PWM (pulse width modulation) circuit 13. The resistor 14 senses the primary current through the flyback transformer 11. The PWM circuit 13 is informed of the sensed primary current by the resistor 14. The PWM circuit 13 is informed of a command value by a power calculation circuit 15. The PWM circuit 13 controls a gate voltage of the power MOS transistor 12 in response to the sensed primary current and the command value so that the sensed primary current will be equal to the command value.

The power calculation circuit 15 is informed of the voltage across a smoothing capacitor 17 described later. The voltage across the smoothing capacitor 17 is equal to a voltage VL applied to the discharge lamp 2 which is referred to as a lamp voltage VL. The current sensing resistor 6 senses a current IL through the discharge lamp 2 which is referred to as a lamp current IL. The power calculation circuit 15 is informed of the lamp current IL by the current sensing resistor 6. The power calculation circuit 15 calculates an electric power (a lamp power) to the discharge lamp 2 from the lamp voltage VL and the lamp current IL. The power calculation circuit 15 determines a command value in accordance with the calculated lamp power. The power calculation circuit 15 outputs a signal of the command value to the PWM circuit 13.

A rectifying diode 16 and the smoothing capacitor 17 are connected to the secondary winding 11b of the flyback transformer 11. An alternating current induced in the secondary winding 11b is rectified by the diode 16 into a first DC current. The first DC current is smoothed by the capacitor 17 into a second DC current which is fed to an H bridge circuit 23.

A starting circuit 21 is connected to the secondary winding 11c of the flyback transformer 11. The starting circuit 21 includes a rectifying diode 18 and a smoothing capacitor 19 which are connected to the secondary winding 11c of the flyback transformer 11. An alternating current induced in the secondary winding 11c is rectified by the diode 18 into a first DC current. The first DC current is smoothed by the capacitor 19 into a second DC voltage. The starting circuit 21 also includes a discharge gap 20 connected to the capacitor 19. The discharge gap 20 provides a spark (an arc) when the voltage B across the capacitor 19 rises to or above a setting voltage.

A high-voltage transformer 22 follows the starting circuit 21. The high-voltage transformer 22 has a primary winding 22a and a secondary winding 22b. The primary winding 22a is connected across the capacitor 19 via the discharge gap 20. When the discharge gap 20 provides a spark, a corresponding discharge current flows through the primary winding 22a. The secondary winding 22b is connected to the discharge lamp 2. The secondary winding 22b induces a high-voltage pulse from the discharge current flowing through the primary winding 22a. The high-voltage pulse is applied to the discharge lamp 2 from the secondary winding 22b.

(2) Inverter Circuit 5

The inverter circuit 5 includes the H bridge circuit 23 and a bridge drive circuit 24. The H bridge circuit 23 has a bridge combination of four power MOS transistors 23a, 23b, 23c, and 23d. The bridge drive circuit 24 controls the power MOS transistors 23a, 23b, 23c, and 23d in response to a control signal voltage J fed from the bridge control circuit 7. Specifically, when the control signal voltage J agrees with a high level, the bridge drive circuit 24 holds the power MOS transistors 23a and 23b in on states and holds the power MOS transistors 23c and 23d in off states. When the control signal voltage J agrees with a low level, the bridge drive circuit 24 holds the power MOS transistors 23a and 23b in off states and holds the power MOS transistors 23c and 23d in on states. The bridge drive circuit 24 includes, for example, a suitable combination of inverters and buffers.

(3) Bridge Control Circuit 7

Figure 2:
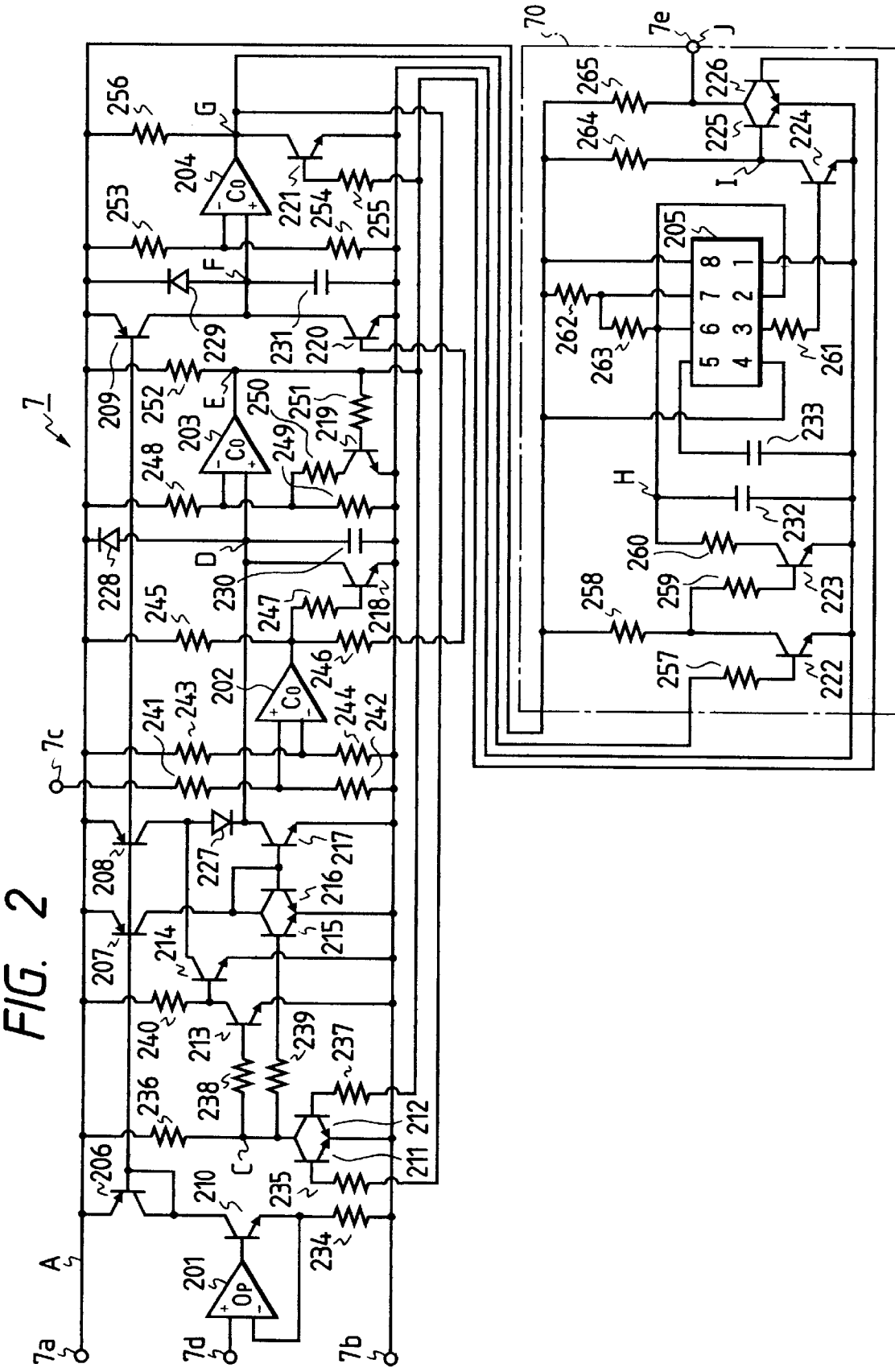
FIG. 2 is a diagram of a bridge control circuit in FIG. 1.

FIG. 2 shows the details of the bridge control circuit 7. With reference to FIG. 2, the bridge control circuit 7 includes power supply input terminals 7a and 7b, a lamp voltage sensing terminal 7c, a lamp current sensing terminal 7d, and a control signal output terminal 7e. The power supply input terminal 7a is connected to the positive terminal of the vehicle battery 1 (see FIG. 1) via the starting switch 3 (see FIG. 1). The power supply input terminal 7b is connected to the negative terminal of the vehicle battery 1 (see FIG. 1). The lamp voltage sensing terminal 7c is connected to the capacitor 17 (see FIG. 1). The lamp current sensing terminal 7d is connected to the current sensing resistor 6 (see FIG. 1). The control signal output terminal 7e is connected to the bridge drive circuit 24 (see FIG. 1).

With reference to FIG. 2, the bridge control circuit 7 includes a series combination of resistors 241 and 242, a series combination of resistors 243 and 244, and a first comparator 202. The resistors 241 and 242 cooperate to divide the lamp voltage VL which appears at the lamp voltage sensing terminal 7c. The resistors 243 and 244 cooperate to divide the power supply voltage A which appears between the power supply input terminals 7a and 7b. The non-inverting input terminal of the first comparator 202 is connected to the junction between the resistors 241 and 242. The inverting input terminal of the first comparator 202 is connected to the junction between the resistors 243 and 244. The first comparator 202 serves to remove charges from capacitors 230 and 231 or to reset voltages thereacross to zero levels in the event that the discharge lamp 2 goes out after its start.

The base of an NPN transistor 218 is connected to the output terminal of the first comparator 202 via a resistor 247. The capacitor 230 is connected between the emitter and the collector of the NPN transistor 218. When the output signal of the first comparator 202 agrees with a high level, the NPN transistor 218 is in an on state. In this case, the NPN transistor 218 removes charges from the capacitor 230 or resets the voltage D across the capacitor 230 to a zero level. When the output signal of the first comparator 202 agrees with a low level, the NPN transistor 218 is in an off state. In this case, the NPN transistor 218 allows the capacitor 230 to be charged by a current depending on the lamp current IL or to be discharged with a current depending on the lamp current IL.

The base of an NPN transistor 220 is connected to the output terminal of the first comparator 202 via a resistor 246. The capacitor 231 is connected between the emitter and the collector of the NPN transistor 220. It is preferable that the capacitance of the capacitor 231 equals that of the capacitor 230. When the output signal of the first comparator 202 agrees with the high level, the NPN transistor 220 is in an on state. In this case, the NPN transistor 220 removes charges from the capacitor 231 or resets the voltage F across the capacitor 231 to a zero level. When the output signal of the first comparator 202 agrees with the low level, the NPN transistor 220 is in an off state. In this case, the NPN transistor 220 allows the capacitor 231 to be charged by a current depending on the lamp current IL.

A series combination of a PNP transistor 208 and a diode 227 is connected to the capacitor 230. The combination of the PNP transistor 208 and the diode 227 serves to supply the capacitor 230 with a charging current depending on the lamp current IL. An NPN transistor 217 is connected to the capacitor 230. The NPN transistor 217 serves to allow a discharging current, depending on the lamp current IL, to flow from the capacitor 230.

The non-inverting input terminal of a second comparator 203 is connected to the capacitor 230. The inverting input terminal of the second comparator 203 is connected to the junction between resistors 248 and 249 which are connected so as to divide the power supply voltage A.

The base of an NPN transistor 219 is connected to the output terminal of the second comparator 203 via a resistor 251. When the output signal E of the second comparator 203 agrees with a low level, the NPN transistor 219 is in an off state. In this case, the NPN transistor 219 sets the voltage at the inverting input terminal of the second comparator 203 equal to a first reference voltage V1 which results from the division of the power supply voltage A by the resistors 248 and 249. When the output signal E of the second comparator 203 agrees with a high level, the NPN transistor 219 is in an on state. In this case, the NPN transistor 219 sets the voltage at the inverting input terminal of the second comparator 203 equal to a second reference voltage V2 which results from the division of the power supply voltage A by the resistors 248 and 249 and a resistor 250. The second reference voltage V2 is lower than the first reference voltage V1.

The base of an NPN transistor 226 in an oscillation circuit 70 is connected to the output terminal of the second comparator 203. When the output signal E of the second comparator 203 agrees with the high level, the NPN transistor 226 is in an on state. In this case, the NPN transistor 226 sets a control signal voltage J to a low level. When the output signal E of the second comparator 203 agrees with the low level, the NPN transistor 226 is in an off state. In this case, the NPN transistor 226 sets the control signal voltage J to a high level provided that an NPN transistor 225 is also in an off state.

The base of an NPN transistor 212 is connected to the output terminal of the second comparator 203 via a resistor 237. When the output signal E of the second comparator 203 agrees with the high level, the NPN transistor 212 is in an on state. In this case, the NPN transistor 212 sets a voltage C at the collector of the NPN transistor 212 equal to a low level. When the output signal E of the second comparator 203 agrees with the low level, the NPN transistor 212 is in an off state. In this case, the NPN transistor 212 sets the voltage C to a high level provided that an NPN transistor 211 is also in an off state. The NPN transistor 211 will be described later.

The base of an NPN transistor 221 is connected to the output terminal of the second comparator 203 via a resistor 255. When the output signal E of the second comparator 203 agrees with the high level, the NPN transistor 221 is in an on state. In this case, the NPN transistor 221 sets a voltage G at the collector of the NPN transistor 221 equal to a low level even when the output signal of a third comparator 204 agrees with a high level. The third comparator 204 will be described later. When the output signal E of the second comparator 203 agrees with the low level, the NPN transistor 221 is in an off state. In this case, the NPN transistor 221 sets the voltage G to a high level provided that the output signal of the third comparator 204 agrees with a high level.

A PNP transistor 209 is connected to the capacitor 231. The PNP transistor 209 serves to supply the capacitor 231 with a current depending on the lamp current IL. The non-inverting input terminal of the third comparator 204 is connected to the capacitor 231. The inverting input terminal of the third comparator 204 is connected to the junction between resistors 253 and 254. The resistors 253 and 254 are connected so as to divide the power supply voltage A, thereby generating a third reference voltage V3. The inverting input terminal of the third comparator 204 is subjected to the third reference voltage V3. The third reference voltage V3 is higher than the first reference voltage V1.

The collector of the NPN transistor 221 is connected to the output terminal of the third comparator 204. The base of an NPN transistor 222 in the oscillation circuit 70 is connected via a resistor 257 to the junction between the output terminal of the third comparator 204 and the collector of the NPN transistor 221. The base of an NPN transistor 223 is connected to the collector of the NPN transistor 222 via a resistor 259. When the voltage G at the junction between the output terminal of the third comparator 204 and the NPN transistor 221 agrees with a low level, the NPN transistor 223 is in an on state in response to operation of the NPN transistor 221. In this case, the NPN transistor 223 holds a voltage H at a sixth input terminal (a sixth pin) of a timer circuit 205 equal to a division-resultant voltage provided by resistors 262, 263, and 260. When the voltage G agrees with a high level, the NPN transistor 223 is in an off state in response to operation of the NPN transistor 222. In this case, the NPN transistor 223 enables a capacitor 232 to be charged.

The base of the NPN transistor 211 is connected to the collector of the NPN transistor 221 via a resistor 235. When the voltage G agrees with the high level, the NPN transistor 211 is in an on state. In this case, the NPN transistor 211 sets the voltage C to the low level. When the voltage G agrees with the low level, the NPN transistor 211 is in an off state. In this case, the NPN transistor 211 sets the voltage C to the high level provided that the NPN transistor 212 is also in the off state.

The base of an NPN transistor 213 is connected to the collectors of the NPN transistors 211 and 212 via a resistor 238. The base of an NPN transistor 214 is connected to the collector of the NPN transistor 213. The collector of a PNP transistor 208 is connected to the collector of the NPN transistor 214. When the voltage C agrees with a high level, the NPN transistor 214 is in an off state in response to operation of the NPN transistor 213. In this case, the NPN transistor 214 allows the capacitor 230 to be charged by a current flowing through the PNP transistor 208. When the voltage C agrees with a low level, the NPN transistor 214 is in an on state in response to operation of the NPN transistor 213. In this case, the NPN transistor 214 inhibits the flow of a current from the PNP transistor 208 into the capacitor 230.

The base of an NPN transistor 215 is connected to the collectors of the NPN transistors 211 and 212 via a resistor 239. The emitter of an NPN transistor 216 is connected to the emitter of the NPN transistor 215. The collector of the NPN transistor 216 is connected to the collector of the NPN transistor 215. The base of the NPN transistor 216 is connected to the collector thereof. The base of an NPN transistor 217 and also the collector of a PNP transistor 207 are connected to the base of the NPN transistor 216. Thereby, a current mirror circuit is provided.

The timer circuit 205 and parts connected thereto compose a multivibrator. A commercially-available IC chip such as "μPC617" produced by NEC Corporation can be used as the timer circuit 205. The timer circuit 205 continuously sets a voltage at its third output terminal (its third pin) equal to a high level until the input voltage H at its sixth input terminal rises to or above a fourth reference voltage V4. In addition, the timer circuit 205 continuously sets the voltage at its third output terminal equal to a low level until the input voltage H at its sixth input terminal drops to or below a fifth reference voltage V5. The fourth reference voltage V4 is approximately equal to two thirds of the power supply voltage A. The fifth reference voltage V5 is approximately equal to one third of the power supply voltage A. The timer circuit 205 changes a voltage at its seventh output terminal (its seventh pin) to a low level when the input voltage H at its sixth input terminal rises to or above the fourth reference voltage V4. In addition, the timer circuit 205 changes the voltage at its seventh output terminal to a high level when the input voltage H at its sixth input terminal drops to or below the fifth reference voltage V5.

The base of an NPN transistor 224 is connected to the third output terminal of the timer circuit 205 via a resistor 261. The base of the NPN transistor 225 is connected to the collector of the NPN transistor 224. When the voltage at the third output terminal of the timer circuit 205 agrees with a high level, the NPN transistor 224 is in an on state. In this case, the NPN transistor 224 sets a base voltage I of the NPN transistor 225 to a low level. When the voltage at the third output terminal of the timer circuit 205 agrees with a low level, the NPN transistor 224 is in an off state. In this case, the NPN transistor 224 sets the base voltage I of the NPN transistor 225 to a high level. When the base voltage I of the NPN transistor 225 agrees with a low level, the NPN transistor 225 is in an off state. In this case, the NPN transistor 225 sets the control signal voltage J to the high level provided that the previously-mentioned NPN transistor 226 is in the off state. When the base voltage I of the NPN transistor 225 agrees with a high level, the NPN transistor 225 is in an on state. In this case, the NPN transistor 225 sets the control signal voltage J to the low level.

A series combination of a PNP transistor 206, an NPN transistor 210, and a resistor 234 is connected between the power supply input terminals 7a and 7b. The base of the PNP transistor 206 is connected to the collector thereof The base of the NPN transistor 210 is connected to the output terminal of an operational amplifier 201. The non-inverting input terminal of the operational amplifier 201 is connected to the lamp current sensing terminal 7d. The inverting input terminal of the operational amplifier 201 is connected to the junction between the emitter of the NPN transistor 210 and the resistor 234. The operational amplifier 201 sets the emitter voltage of the NPN transistor 210 equal to a voltage at the lamp current sensing terminal 7d which is proportional to the lamp current IL.

The bases of the previously-mentioned PNP transistors 207, 208, and 209 are connected to the base of the PNP transistor 206. The PNP transistor 206 enables a current, depending on the lamp current IL, to flow through each of the PNP transistors 207, 208, and 209.

The bridge control circuit 7 of FIG. 2 further includes diodes 228 and 229, a capacitor 233, and resistors 236, 240, 245, 252, 256, 258, 264, and 265.

Figure 3:
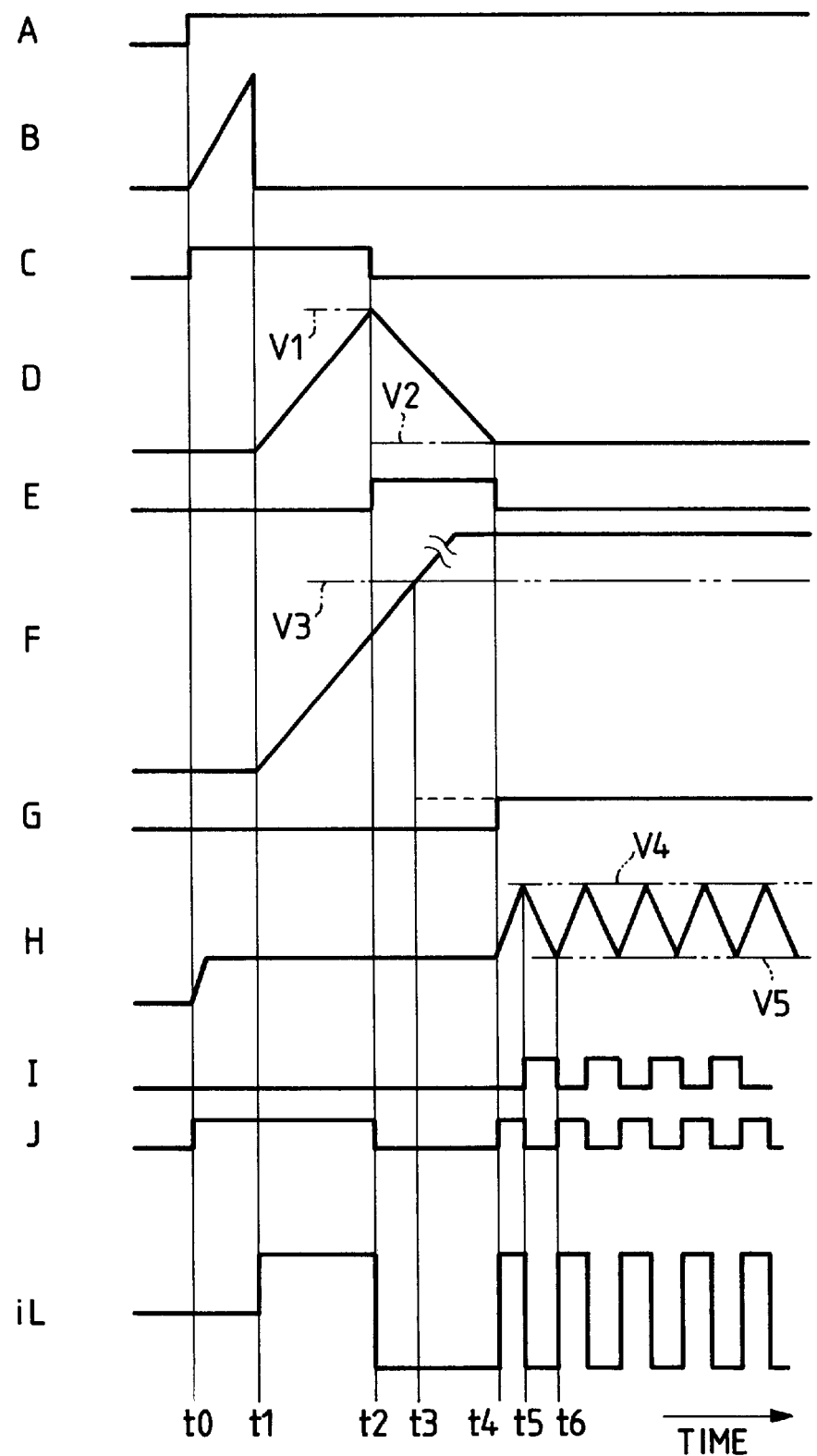
FIG. 3 is a time-domain diagram of various signals in the discharge-lamp lighting device in FIG. 1.

The bridge control circuit 7 of FIG. 2 operates as follows. With reference to FIG. 3, the starting switch 3 (see FIG. 1) is moved to an on position at a moment t0. At the moment t0, the voltage D across the capacitor 230 is equal to 0 volt so that the output signal E of the second comparator 203 agrees with the low level. Therefore, at the moment t0, the NPN transistor 226 is in the off state.

At the moment t0, the voltage F across the capacitor 231 is equal to 0 volt so that the output signal of the third comparator 204 or the voltage G agrees with the low level. At the moment t0, the NPN transistor 222 is in the off state while the NPN transistor 223 is in the on state. At the moment t0, the input voltage H at the sixth input terminal of the timer circuit 205 rises to the voltage resulting from the division of the power supply voltage A by the resistors 262, 263, and 260. At the moment t0, the output voltage at the third output terminal of the timer circuit 205 agrees with the high level while the base voltage I of the NPN transistor 225 is equal to the low level and therefore the NPN transistor 225 is in the off state.

Accordingly, at the moment t0, both the NPN transistors 225 and 226 are in the off states so that the control signal voltage J rises to the high level. The high-level control signal voltage J enables the set of the power MOS transistors 23a and 23b (see FIG. 1) to be in the on states.

At the moment t0, the output signal E of the second comparator 203 agrees with the low level, and the NPN transistor 212 is in the off state. At the moment t0, the output signal of the third comparator 204 or the voltage G agrees with the low level, and the NPN transistor 211 is in the off state. Accordingly, at the moment t0, both the NPN transistors 211 and 212 are in the off states so that the voltage C rises to the high level and the NPN transistors 214 and 217 are in the off states. Thus, at the moment t0, the capacitor 230 is in a state where the charging thereof can be started in response to a later change of the NPN transistor 218 to the off state.

With reference to FIG. 3, after the starting switch 3 is moved to the on position (the moment t0), the voltage B across the capacitor 19 increases as a result of operation of the flyback transformer 11 and other parts.

At a moment t1 following the moment t0, the discharge gap 20 starts to provide a spark so that an effective lamp current (a positive-direction lamp current) IL commences to flow through the discharge lamp 2. The flow of the lamp current IL through the discharge lamp 2 causes a drop in the lamp voltage VL. The output signal of the first comparator 202 changes to the low level in response to the drop in the lamp voltage VL, and hence the NPN transistor 218 changes to the off state. As a result, the capacitor 230 starts to be charged by a current depending on the lamp current IL. Thus, at the moment t1, the voltage D across the capacitor 230 starts to rise at a rate depending on the lamp current IL. The charging current into the capacitor 230 is fed via the PNP transistor 208 and the diode 227.

When the output signal of the first comparator 202 changes to the low level, the NPN transistor 220 changes to the off state. As a result, the capacitor 231 starts to be charged by a current depending on the lamp current IL. Thus, at the moment t1, the voltage F across the capacitor 231 starts to rise at a rate depending on the lamp current IL. The charging current into the capacitor 231 is fed via the PNP transistor 209.

With reference to FIG. 3, at a moment t2 following the moment t1, the voltage D across the capacitor 230 rises to or above the first reference voltage Vi so that the output signal E of the second comparator 203 changes to the high level. When the output signal E of the second comparator 203 changes to the high level, the NPN transistor 219 changes to the on state. Thereby, the input voltage at the inverting input terminal of the second comparator 203 changes from the first reference voltage V1 to the second reference voltage V2.

When the output signal E of the second comparator 203 changes to the high level, the NPN transistor 212 changes to the on state. Therefore, the voltage C changes to the low level, and the NPN transistor 214 changes to the on state in response to operation of the NPN transistor 213. Thus, the current from the PNP transistor 208 is now directed toward the NPN transistor 214 rather than the capacitor 230. In other words, the flow of the charging current from the PNP transistor 208 into the capacitor 230 is now inhibited. When the voltage C changes to the low level, the NPN transistors 216 and 217 change to the on states in response to operation of the NPN transistor 215. As a result, the capacitor 230 starts to be discharged with a current depending on the lamp current IL. Thus, at the moment t2, the voltage D across the capacitor 230 starts to drop at a rate depending on the lamp current IL. The discharging current from the capacitor 230 flows via the NPN transistor 217.

When the output signal E of the second comparator 203 changes to the high level, the NPN transistor 226 changes to the on state. As a result, the control signal voltage J changes to the low level, and the set of the power MOS transistors 23c and 23d (see FIG. 1) change to the on states in response to the low-level control signal voltage J. Accordingly, at the moment t2, the positive-direction lamp current iL is replaced by a negative-direction lamp current iL. When the output signal E of the second comparator 203 changes to the high level, the NPN transistor 221 changes to the on state.

With reference to FIG. 3, at a moment t3 following the moment t2, the voltage F across the capacitor 231 rises to or above the third reference voltage V3 so that the output signal of the third comparator 204 changes to the high level. Since the NPN transistor 221 is in the on state, the voltage G remains equal to the low level regardless of the change of the output signal of the third comparator 204 to the high level.

With reference to FIG. 3, at a moment t4 following the moment t3, the voltage D across the capacitor 230 drops to or below the second reference voltage V2 so that the output signal E of the second comparator 203 changes to the low level. As a result, the NPN transistor 226 changes to the off state. At the moment t4, the NPN transistor 225 is in the off state as previously suggested. Accordingly, the control signal voltage J changes to the high level in response to the change of the NPN transistor 226 to the off state. The high-level control signal voltage J enables the set of the power MOS transistors 23a and 23b (see FIG. 1) to be in the on states again. Thus, at the moment t4, the negative-direction lamp current iL is replaced by a positive-direction lamp current iL.

When the output signal E of the second comparator 203 changes to the low level, the NPN transistor 221 changes to the off state. As a result, the voltage G changes to the high level for the first time, and the NPN transistor 222 changes to the on state and the NPN transistor 223 changes to the off state. Therefore, at the moment t4, the capacitor 232 starts to be charged and the input voltage H at the sixth input terminal of the timer circuit 205 commences to rise.

With reference to FIG. 3, at a moment t5 following the moment t4, the input voltage H at the sixth input terminal of the timer circuit 205 rises to or above the fourth reference voltage V4 while the voltage at the third output terminal of the timer circuit 205 changes to the low level. As a result, the NPN transistor 224 changes to the off state, and the base voltage I of the NPN transistor 225 changes to the high level and the NPN transistor 225 changes to the on state. Therefore, the control signal voltage J changes to the low level. The set of the power MOS transistors 23c and 23d (see FIG. 1) change to the on states again in response to the low5 level control signal voltage J. Accordingly, at the moment t5, the positive-direction lamp current iL is replaced by a negative-direction lamp current iL.

At the moment t5, the voltage at the seventh output terminal of the timer circuit 205 changes to the low level.

Accordingly, the capacitor 232 starts to be discharged. Thus, at the moment t5, the input voltage H at the sixth input terminal of the timer circuit 205 commences to drop.

With reference to FIG. 3, at a moment t6 following the moment t5, the input voltage H at the sixth input terminal of the timer circuit 205 drops to or below the fifth reference voltage V5, and the voltage at the third output terminal of the timer circuit 205 changes to the high level. As a result, the NPN transistor 224 changes to the on state, and the base voltage I of the NPN transistor 225 changes to the low level and the NPN transistor 225 changes to the off state. At the moment t6, the NPN transistor 226 is in the off state. Therefore, the control signal voltage J changes to the high level. The set of the power MOS transistors 23a and 23b (see FIG. 1) change to the on states again in response to the high-level control signal voltage J. Accordingly, at the moment t6, the negative2 direction lamp current iL is replaced by a positive-direction lamp current iL.

At the moment t6, the voltage at the seventh output terminal of the timer circuit 205 changes to the high level. As a result, the capacitor 232 starts to be charged. Thus, at the moment t6, the input voltage H at the sixth input terminal of the timer circuit 205 commences to rise.

During a time interval after the moment t6, the capacitor 232 is periodically and alternately charged and discharged in response to the relation among the voltage across the capacitor 232 and the fourth and fifth reference voltages V4 and V5. In addition, the control signal voltage J alternates between the high level and the low level within a relatively short period. Thus, the discharge lamp 2 is activated by an alternating current having a rectangular waveform.

The bridge drive circuit 24 controls and drives the power MOS transistors 23a, 23b, 23c, and 23d in response to the control signal voltage J. As shown in FIG. 3, the lamp current iL which flows through the discharge lamp 2 changes in response to the control signal voltage J.

The bridge control circuit 7 includes the oscillation circuit 70 and the controlling means. The oscillation circuit 70 determines the frequency of operation of the inverter circuit 5. The controlling means in the bridge control circuit 7 serves to control the oscillation frequency of the oscillation circuit 70 to feed a low-frequency AC power to the discharge lamp 2 during an interval in the start of the discharge lamp 2. In addition, the controlling means in the bridge control circuit 7 serves to adjust the previously-indicated interval in response to the lamp current IL. The controlling means in the bridge control circuit 7 includes the capacitor 230 and a current controlling circuit. The current controlling circuit in the controlling means includes the devices 201, 206, 207, 208, 210, 215, 216, 217, and 234. The current controlling circuit in the controlling means serves to charge and discharge the capacitor 230 with a charging current and a discharging current which depend on the lamp current IL. The controlling means in the bridge control circuit 7 adjusts the ratio between portions of the previously-indicated interval which correspond to a positive-current flow time and a negative-current flow time respectively. The ratio adjustment implemented by the controlling means is designed so as to approximately equalize the value of integration of the lamp current IL in a positive side and the value of integration of the lamp current IL in a negative side.

In the discharge-lamp starting case where the lamp current IL is relatively great, the duration of feed of a one-direction current to the discharge lamp 2 is relatively short. On the other hand, in the discharge-lamp starting case where the lamp current IL is relatively small, the duration of feed of a one-direction current to the discharge lamp 2 is relatively long. These processes are effective to prevent the discharge lamp 2 from going out upon a change of the polarity or direction of the lamp current between the positive side and the negative side.

As previously described, the value of integration of the positive lamp current and the value of integration of the negative lamp current are approximately equal to each other. This is effective to prevent one of the electrodes of the discharge lamp 2 from diminishing in size. It should be noted that a one-electrode diminishing problem would be caused by the feed of a one-direction current to the discharge lamp 2 during a long time.

In the event that the discharge lamp 2 goes out, the lamp voltage VL rises and hence the output signal of the first comparator 202 changes to the high level. Therefore, the NPN transistor 218 changes to the on state so that the capacitor 230 is discharged and is thus reset to the initial state where the voltage D thereacross is equal to 0 volt. At the same time, the NPN transistor 220 changes to the on state so that the capacitor 231 is discharged and is thus reset to the initial state where the voltage F thereacross is equal to 0 volt. Accordingly, upon the application of a high-voltage pulse to the discharge lamp 2, a sequence of the previously-indicated processes is restarted as at the moment t1.

Second Embodiment

Figure 4:
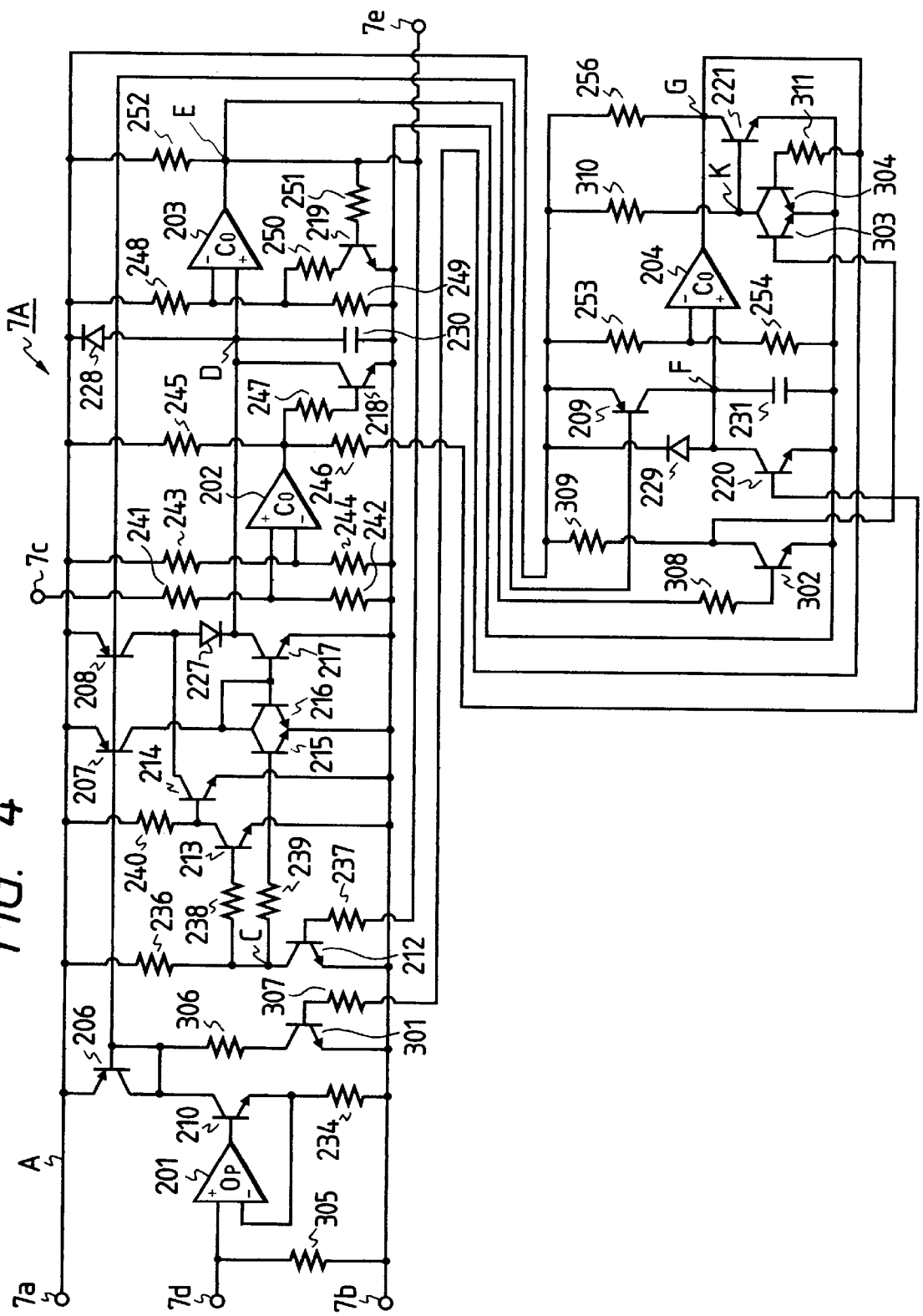
FIG. 4 is a diagram of a bridge control circuit in a discharge-lamp lighting device according to a second embodiment of this invention.

A second embodiment of this invention is similar to the embodiment of FIGS. 1–3 except that a bridge control circuit 7A replaces the bridge control circuit 7 (see FIGS. 1 and 2). FIG. 4 shows the details of the bridge control circuit 7A.

With reference to FIG. 4, the bridge control circuit 7A includes parts and devices 7a, 7b, 7c, 7d, 7e, 201–204, 206–210, 212–221, 227–231, 234, 236–254, and 256 as the bridge control circuit 7 does. An output signal E of a second comparator 203 in the bridge control circuit 7A corresponds to the control signal voltage J in the embodiment of FIGS. 1–3. In other words, the output signal E of the second comparator 203 in the bridge control circuit 7A is used instead of the control signal voltage. J in the embodiment of FIGS. 1–3. The multivibrator including the timer circuit 205 (see FIG. 2) and the related parts is omitted from the bridge control circuit 7A.

The bridge control circuit 7A is basically similar to the bridge control circuit 7 (see FIG. 2) except for design changes indicated hereinafter.

With reference to FIG. 4, the second comparator 203 forms an oscillation circuit. The base of an NPN transistor 302 is connected to the output terminal of the second comparator 203 via a resistor 308. The base of an NPN transistor 303 is connected to the collector of the NPN transistor 302. The base of an NPN transistor 221 is connected to the collector of the NPN transistor 303. When the output signal E of the second comparator 203 agrees with a high level, the NPN transistor 302 is in an on state. When the output signal E of the second comparator 203 agrees with a low level, the NPN transistor 302 is in an off state. When the NPN transistor 302 is in the on state, the NPN transistor 303 is in an off state. In this case, the NPN transistor 303 sets the base voltage K of the NPN transistor 221 equal to a high level provided that an NPN transistor 304 is in an off state. The NPN transistor 304 will be described later. When the NPN transistor 302 is in the off state, the NPN transistor 303 is in an on state. In this case, the NPN transistor 303 sets the base voltage K of the NPN transistor 221 equal to a low level.

The collector of the NPN transistor 221 is connected to the output terminal of a third comparator 204. The base of the NPN transistor 304 is connected via a resistor 311 to the junction between the output terminal of the third comparator 204 and the collector of the NPN transistor 221. When a voltage G at the junction between the output terminal of the third comparator 204 and the collector of the NPN transistor 221 agrees with a high level, the NPN transistor 304 is in an on state. In this case, the NPN transistor 304 sets the base voltage K of the NPN transistor 221 equal to the low level. When the voltage G agrees with a low level, the NPN transistor 304 is in an off state. In this case, the NPN transistor 304 sets the base voltage K of the NPN transistor 221 equal to the high level provided that the NPN transistor 303 is in the off state.

The base of the NPN transistor 301 is connected via a resistor 307 to the junction between the output terminal of the third comparator 204 and the collector of the NPN transistor 221. A resistor 306 is connected in series with the NPN transistor 301. A series combination of an NPN transistor 210 and a resistor 234 is connected in parallel with the series combination of the NPN transistor 301 and the resistor 306. When the voltage G at the junction between the output terminal of the third comparator 204 and the collector of the NPN transistor 221 agrees with the high level, the NPN transistor 301 is in an on state. In this case, the NPN transistor 301 serves to increase a current flowing through a PNP transistor 206. When the voltage G agrees with the low level, the NPN transistor 301 is in an off state. In this case, the NPN transistor 301 sets a current, flowing through the PNP transistor 206, to a relatively-small value depending on a lamp current IL.

The bridge control circuit 7A of FIG. 4 further includes resistors 305, 309, and 310.

Figure 5:
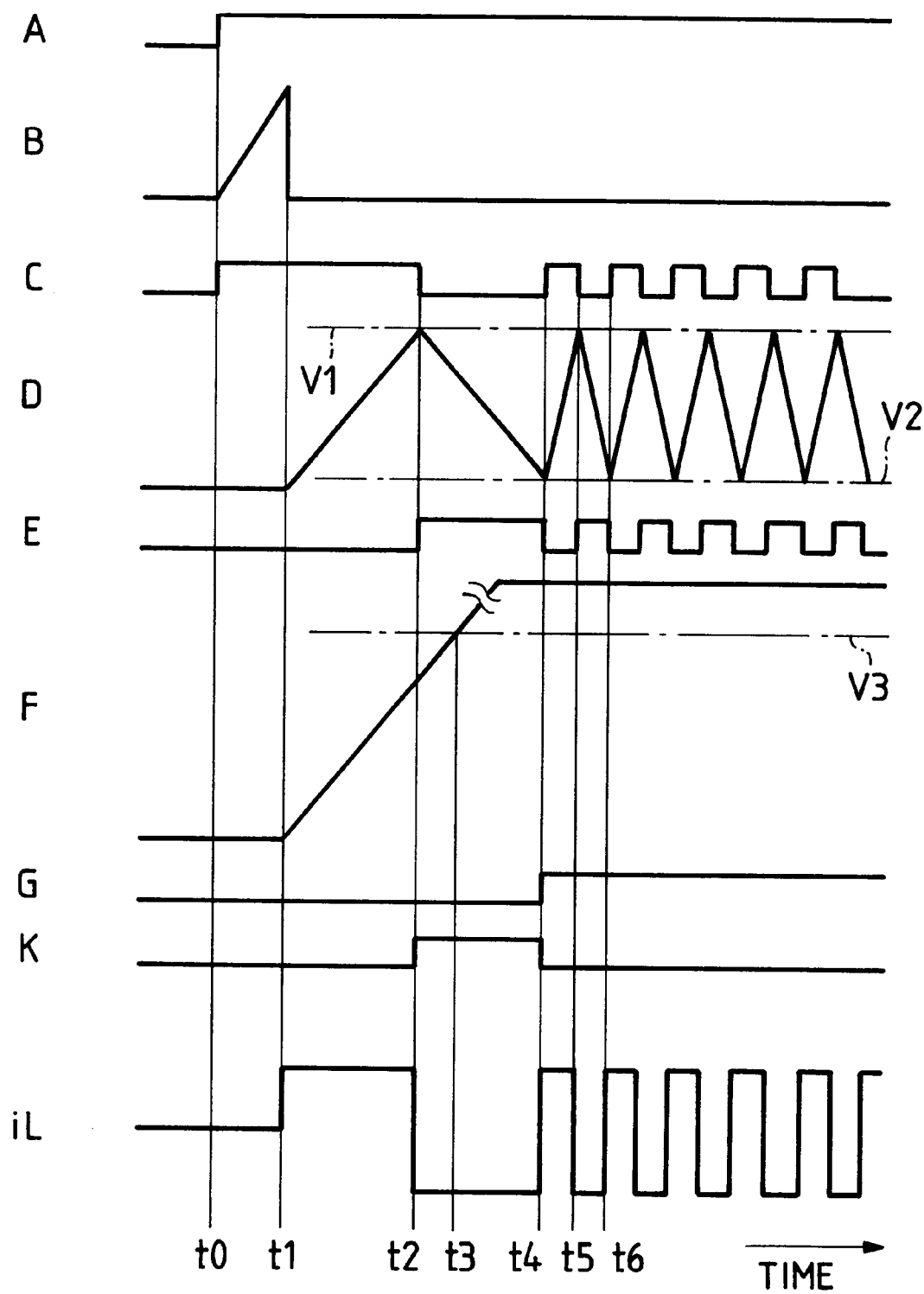
FIG. 5 is a time-domain diagram of various signals in the discharge-lamp lighting device of the second embodiment of this invention.

The bridge control circuit 7A of FIG. 4 operates as follows. With reference to FIG. 5, a starting switch 3 (see FIG. 1) is moved to an on position at a moment t0. At the moment t0, the voltage D across a capacitor 230 is equal to 0 volt so that the output signal E of the second comparator 203 or the control signal voltage E agrees with the low level. The low-level control signal voltage E enables a set of power MOS transistors 23c and 23d (see FIG. 1) to be in on states.

At the moment t0, the output signal E of the second comparator 203 agrees with the low level, and hence an NPN transistor 212 is in an off state. Therefore, a voltage C at the collector of the transistor 212 agrees with a high level, and an NPN transistor 214 is in an off state in response to operation of an NPN transistor 213. Also, an NPN transistor 217 is in an off state in response to operation of an NPN transistor 215. Thus, at the moment t0, the capacitor 230 is in a state where the charging thereof can be started in response to a later change of the NPN transistor 218 to an off state.

At the moment t0, the output signal E of the second comparator 203 agrees with the low level, and the NPN transistor 303 is in the on state in response to operation of the NPN transistor 302. Accordingly, the base voltage K of the NPN transistor 221 agrees with the low level, and the NPN transistor 221 is in the off state.

At the moment t0, the voltage F across a capacitor 231 is equal to 0 volt so that the output signal of the third comparator 204 or the voltage G agrees with the low level. Therefore, even when the NPN transistor 221 is in the off state, the voltage G is thus equal to the low level since the third comparator 204 outputs the low-level signal. The low-level voltage G causes the NPN transistor 301 to be in the off state. Accordingly, the current flowing through the PNP transistor 206 is set to a value depending on the lamp current IL.

With reference to FIG. 5, after the starting switch 3 is moved to the on position (the moment t0), the voltage B across a capacitor 19 (see FIG. 1) increases as a result of operation of a flyback transformer 11 (see FIG. 1) and other parts.

At a moment t1 following the moment t0, a discharge gap 20 (see FIG. 1) starts to provide a spark so that an effective lamp current (a positive-direction lamp current) IL commences to flow through a discharge lamp 2 (see FIG. 1). The flow of the lamp current IL through the discharge lamp 2 causes a drop in a lamp voltage VL. The output signal of a first comparator 202 changes to a low level in response to the drop in the lamp voltage VL, and hence the NPN transistor 218 changes to the off state. As result, the capacitor 230 starts to be charged by a current depending on the lamp current IL. Thus, at the moment t1, the voltage D across the capacitor 230 starts to rise at a rate depending on the lamp current IL. The charging current into the capacitor 230 is fed via a PNP transistor 208 and a diode 227.

When the output signal of the first comparator 202 changes to the low level, an NPN transistor 220 changes to an off state. As a result, the capacitor 231 starts to be charged by a current depending on the lamp current IL. Thus, at the moment t1, the voltage F across the capacitor 231 starts to rise at a rate depending on the lamp current IL. The charging current into the capacitor 231 is fed via a PNP transistor 209.

With reference to FIG. 5, at a moment t2 following the moment t1, the voltage D across the capacitor 230 rises to or above a first reference voltage V1 so that the output signal E of the second comparator 203 or the control signal voltage E changes to the high level. A set of power MOS transistors 23a and 23b (see FIG. 1) change to on states in response to the high-level control signal voltage E. Accordingly, at the moment t2, the positive-direction lamp current iL is replaced by a negative-direction lamp current iL.

When the output signal E of the second comparator 203 changes to the high level, an NPN transistor 219 changes to an on state. Thereby, the input voltage at the inverting input terminal of the second comparator 203 changes from the first reference voltage V1 to a second reference voltage V2.

When the output signal E of the second comparator 203 changes to the high level, the NPN transistor 212 changes to the on state. Therefore, the voltage C changes to the low level, and the NPN transistor 214 changes to the on state in response to operation of the NPN transistor 213. Thus, the current from the PNP transistor 208 is now directed toward the NPN transistor 214 rather than the capacitor 230. In other words, the flow of the charging current from the PNP transistor 208 into the capacitor 230 is now inhibited. When the voltage C changes to the low level, an NPN transistor 216 and the NPN transistor 217 change to on states in response to operation of the NPN transistor 215. As a result, the capacitor 230 starts to be discharged with a current depending on the lamp current IL. Thus, at the moment t2, the voltage D across the capacitor 230 starts to drop at a rate depending on the lamp current IL. The discharging current from the capacitor 230 flows via the NPN transistor 217.

When the output signal E of the second comparator 203 changes to the high level, the NPN transistor 303 changes to the off state in response to operation of the NPN transistor 302. At the moment t2, the voltage G agrees with the low level, and hence the NPN transistor 304 is in the off state. Accordingly, at the moment t2, the base voltage K of the NPN transistor 221 changes to the high level, and the NPN transistor 221 changes to the on state.

With reference to FIG. 5, at a moment t3 following the moment t2, the voltage F across the capacitor 231 rises to or above a third reference voltage V3 so that the output signal of the third comparator 204 changes to the high level. Since the NPN transistor 221 is in the on state, the voltage G remains equal to the low level regardless of the change of the output signal of the third comparator 204 to the high level.

With reference to FIG. 3, at a moment t4 following the moment t3, the voltage D across the capacitor 230 drops to or below the second reference voltage V2 so that the output signal E of the second comparator 203 or the control signal voltage E changes to the low level. The low-level control signal voltage E enables the set of the power MOS transistors 23c and 23d (see FIG. 1) to be in the on states again. Accordingly, at the moment t4, the negative-direction lamp current iL is replaced by a positive-direction lamp current iL.

When the output signal E of the second comparator 203 changes to the low level, the NPN transistor 212 changes to the off state. As a result, the voltage C at the collector of the NPN transistor 212 changes to the high level. The NPN transistors 214 and 217 change to the off states in response to the change of the voltage C to the high level, so that the capacitor 230 can be charged by a current fed via the PNP transistor 208 and the diode 227. The charging current into the capacitor 230 is greater than the charging current thereinto which occurs before the moment t2. Therefore, at the moment t4, the capacitor 230 starts to be charged, and the voltage D across the capacitor 230 commences to rise at a rate greater than that occurring before the moment t2.

When the output signal E of the second comparator 203 changes to the low level, the NPN transistor 303 changes to the on state in response to operation of the NPN transistor 302. As a result, at the moment t4, the base voltage K of the NPN transistor 221 changes to the low level. The NPN transistor 221 changes to the off state in response to the low-level base voltage K. At the moment t4, the third comparator 204 outputs the high-level signal as previously described. Thus, at the moment t4, the voltage G changes to the high level for the first time. When the voltage G changes to the high level, the NPN transistor 301 changes to the on state. The change of the NPN transistor 301 to the on state increases the current through the PNP transistor 206 by a value corresponding to the current through the NPN transistor 301. Accordingly, after the moment t4, currents flowing through the PNP transistors 207, 208, and 209 are also increased.

With reference to FIG. 5, at a moment t5 following the moment t4, the voltage D across the capacitor 230 rises to or above the first reference voltage V1 so the output signal E of the second comparator 203 or the control signal voltage E changes to the high level. Thus, the set of the power MOS transistors 23a and 23b (see FIG. 1) change to the on states in response to the high-level control signal voltage E. Accordingly, at the moment t5, the positive-direction lamp current iL is replaced by a negative-direction lamp current IL.

When the output signal E of the second comparator 203 changes to the high level, the NPN transistor 212 changes to the on state so that the voltage C changes to the low level. As a result, at the moment t5, the NPN transistors 214 and 217 change to the on states, and the capacitor 230 starts to be discharged with an increased current. Thus, at the moment t5, the voltage D across the capacitor 230 starts to drop at an increased rate.

When the output signal E of the second comparator 203 changes to the high level, the NPN transistor 303 changes to the off state in response to operation of the NPN transistor 302. Since the NPN transistor 304 is in the on state, the base voltage K of the NPN transistor 221 agrees with the low level so that the NPN transistor 221 remains in the off state. Therefore, at the moment t5, the voltage G remains equal to the high level, and the increased current through the PNP transistor 206 continues to occur.

With reference to FIG. 5, at a moment t6 following the moment t5, the voltage D across the capacitor 230 drops to or below the second reference voltage V2 so that the output signal E of the second comparator 203 or the control signal voltage E changes to the low level. Therefore, the set of the power MOS transistors 23c and 23d (see FIG. 1) change to the on states again in response to the low-level control signal voltage E. Thus, at the moment t6, the negative-direction lamp current iL is replaced by a positive-direction lamp current iL.

The NPN transistor 212 changes to the off state in response to the change of the output signal E of the second comparator 203 to the low level. As a result, the voltage C changes to the high level. Therefore, the NPN transistors 214 and 217 change to the off states, and the capacitor 230 starts to be charged by an increased current again. Thus, at the moment t6, the voltage D across the capacitor 230 starts to rise at an increased rate.

During a time interval after the moment t6, the previously-indicated processes in the time interval between the moments t4 and t6 are reiterated. In addition, the control signal voltage E alternates between the high level and the low level within a relatively short period. Thus, the discharge lamp 2 is activated by an alternating current having a rectangular waveform.

The bridge drive circuit 24 controls and drives the power MOS transistors 23a, 23b, 23c, and 23d in response to the control signal voltage E. As shown in FIG. 5, the lamp current iL which flows through the discharge lamp 2 changes in response to the control signal voltage E.

The bridge control circuit 7A of FIG. 4 includes an oscillation circuit and a controlling means. The oscillation circuit in the bridge control circuit 7A is formed by the second comparator 203. The oscillation circuit 203 determines the frequency of operation of an inverter circuit 5 (see FIG. 1). The controlling means in the bridge control circuit 7A serves to control the oscillation frequency of the oscillation circuit 203 to feed a low-frequency power to the discharge lamp 2 during an interval in the start of the discharge lamp 2. In addition, the controlling means in the bridge control circuit 7A serves to adjust the previously-indicated interval in response to the lamp current IL. The controlling means in the bridge control circuit 7A includes the capacitor 230 and a current controlling circuit. The current controlling circuit in the controlling means includes the devices 201, 206, 207, 208, 210, 215, 216, 217, and 234. The current controlling circuit in the controlling means serves to charge and discharge the capacitor 230 with a charging current and a discharging current which depend on the lamp current IL. The controlling means in the bridge control circuit 7A adjusts the ratio between portions of the previously-indicated interval which correspond to a positive-current flow time and a negative-current flow time respectively. The ratio adjustment implemented by the controlling means is designed so as to approximately equalize the value of integration of the lamp current IL in a positive side and the value of integration of the lamp current IL in a negative side.

In the discharge-lamp starting case where the lamp current IL is relatively great, the duration of feed of a one-direction current to the discharge lamp 2 is relatively short. On the other hand, in the discharge-lamp starting case where the lamp current IL is relatively small, the duration of feed of a one-direction current to the discharge lamp 2 is relatively long. These processes are effective to prevent the discharge lamp 2 from going out upon a change of the polarity or direction of the lamp current between the positive side and the negative side.

As previously described, the value of integration of the positive lamp current and the value of integration of the negative lamp current are approximately equal to each other. This is effective to prevent one of the electrodes of the discharge lamp 2 from diminishing in size.

In the event that the discharge lamp 2 goes out, the lamp voltage VL rises and hence the output signal of the first comparator 202 changes to the high level. Therefore, the NPN transistor 218 changes to the on state so that the capacitor 230 is discharged and is thus reset to the initial state where the voltage D thereacross is equal to 0 volt. At the same time, the NPN transistor 220 changes to the on state so that the capacitor 231 is discharged and is thus reset to the initial state where the voltage F thereacross is equal to 0 volt. Accordingly, upon the application of a high-voltage pulse to the discharge lamp 2, a sequence of the previously-indicated processes is restarted as at the moment t1.

Third Embodiment

Figure 6:
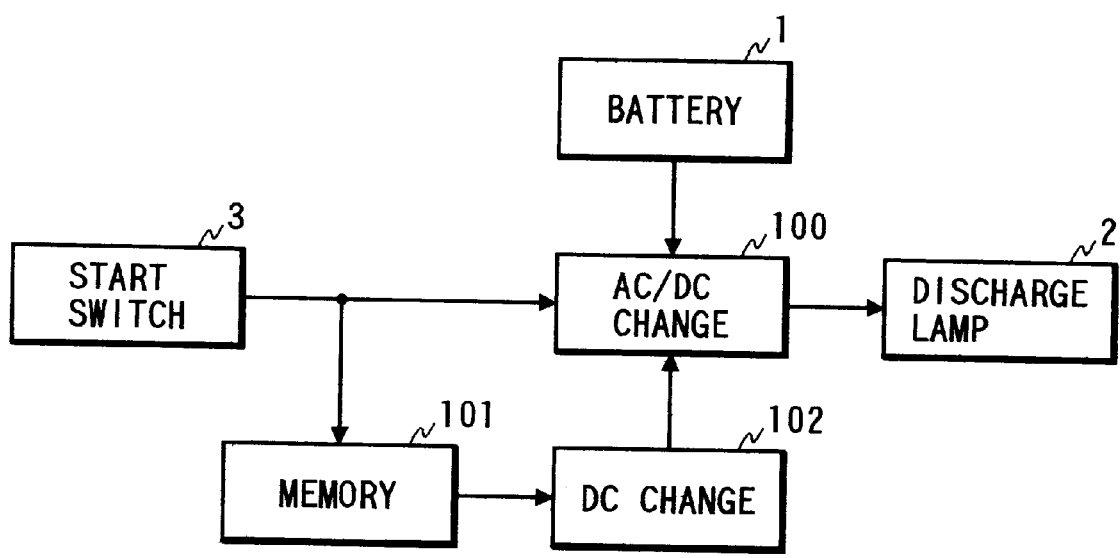
FIG. 6 is a block diagram of a discharge-lamp lighting device according to a third embodiment of this invention.

FIG. 6 shows a discharge-lamp lighting device according to a third embodiment of this invention which operates on a high-voltage discharge lamp 2. The third embodiment of this invention may correspond to a modification of the embodiment of FIGS. 1–3 or a modification of the embodiment of FIGS. 4 and 5. The discharge-lamp lighting device of FIG. 6 includes a battery 1, a starting switch 3, an AC/DC changing device (an AC/DC changing means) 100, a memory (a memory means) 101, and a DC changing device (a DC changing means) 102.

The AC/DC changing device 100 is connected to the battery 1, the discharge lamp 2, the starting switch 3, and the DC changing device 102. The memory 101 is connected to the starting switch 3 and the DC changing device 102.

The AC/DC changing device 100 continues to activate the discharge lamp 2 by a direct current (DC) for a given time interval from the moment of movement of the starting switch 3 to an on position. After the given time interval elapses, the AC/DC changing device 100 activates the discharge lamp 2 by an alternating current (AC).

The memory 101 stores information of every change of the starting switch 3 to its on position. The DC changing device 102 controls the AC/DC changing device 100 in response to information from the memory 101 so that the direction of the direct current fed to the discharge lamp 2 will be changed each time the starting switch 3 is moved to its on position.

Since the direction of the direct current fed to the discharge lamp 2 is changed between opposite directions each time the starting switch 3 is moved to its on position, it is possible to prevent one of electrodes of the discharge lamp 2 from diminishing in size.

Fourth Embodiment

Figure 7:
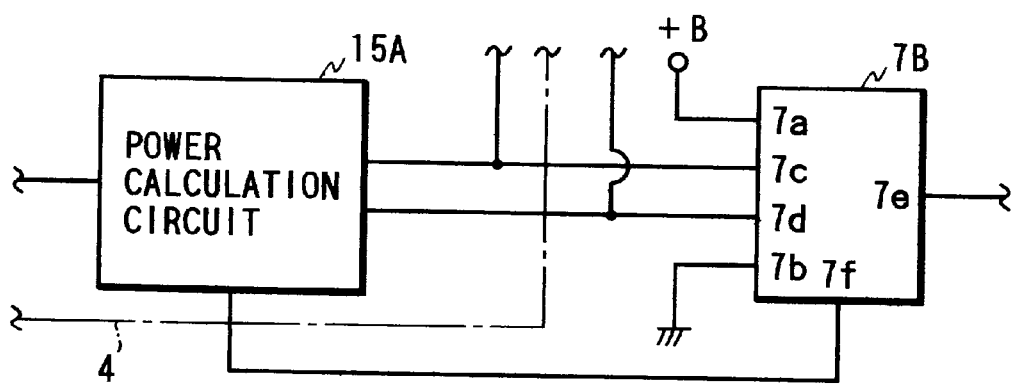
FIG. 7 is a diagram of a portion of a discharge-lamp lighting device according to a fourth embodiment of this invention.

FIG. 7 shows a fourth embodiment of this invention which is similar to the embodiment of FIGS. 1–3 except for a design change indicated hereinafter. The embodiment of FIG. 7 uses a bridge control circuit 7B in place of the bridge control circuit 7 (see FIGS. 1 and 2). The embodiment of FIG. 7 uses a power calculation circuit 15A in place of the power calculation circuit 15 (see FIG. 1). The bridge control circuit 7B has an output terminal 7f connected to the power calculation circuit 15A.

Figure 8:
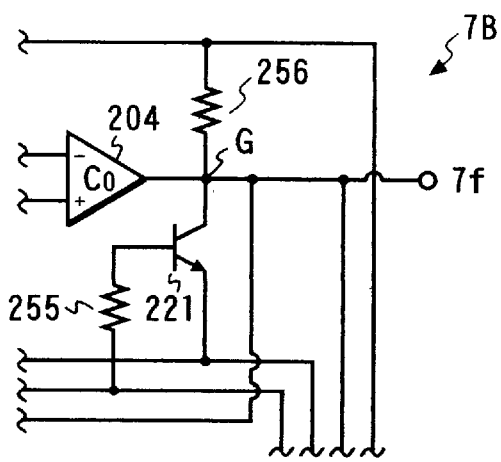
FIG. 8 is a diagram of a portion of a bridge control circuit in the discharge-lamp lighting device of the fourth embodiment of this invention.

The bridge control circuit 7B is similar to the bridge control circuit 7 (see FIGS. 1 and 2) except that as shown in FIG. 8, the output terminal 7f of the bridge control circuit 7B is connected to the junction between the output terminal of a third comparator 204 and the collector of an NPN transistor 221 to receive a voltage G. Accordingly, in the embodiment of FIG. 7, the power calculation circuit 15A is informed of the voltage G.

Figure 9:
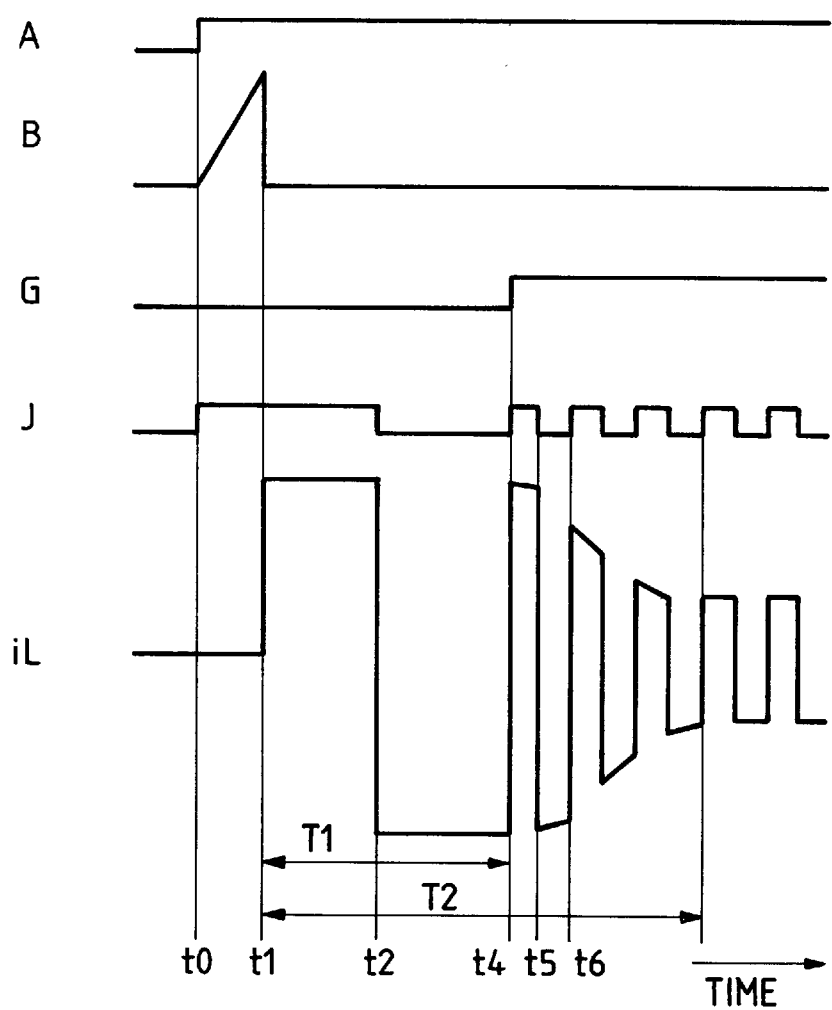
FIG. 9 is a time-domain diagram of various signals in the discharge-lamp lighting device of the fourth embodiment of this invention.

The power calculation circuit 15A controls a PWM circuit 13 (see FIG. 1) in response to the voltage G so that as shown in FIG. 9, during a time interval immediately after start of a high-voltage discharge lamp 2 (see FIG. 1), a lamp current iL will remain increased from a normal level when the voltage G continues to be relatively low. The increased lamp current iL facilitates heating of electrodes of the discharge lamp 2 to an adequately high temperature. Accordingly, it is possible to stably start the discharge lamp 2.

With reference to FIG. 9, the discharge lamp 2 remains supplied with the increased current iL for a time interval T2. A delay or a time lag in the control by the power calculation circuit 15A causes the time interval T2 to be longer than the time length T1 of a first cycle of the lamp current iL. In this way, the time interval T2 of the supply of the increased current to the discharge lamp 2 is extended by using the time lag in the control by the power calculation circuit 15A.

Fifth Embodiment

Figure 10:
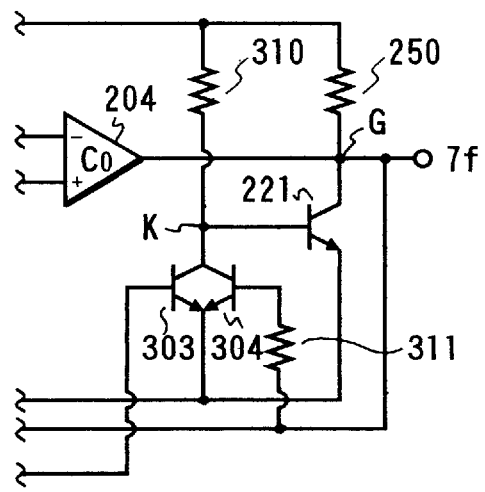
FIG. 10 is a diagram of a portion of a bridge control circuit in a discharge-lamp lighting device according to a fifth embodiment of this invention.

FIG. 10 shows a fifth embodiment of this invention which is similar to the embodiment of FIGS. 7–9 except for a design change indicated hereinafter. The embodiment of FIG. 10 uses a bridge control circuit 7C in place of the bridge control circuit 7B (see FIGS. 7 and 8). The bridge control circuit 7C has an output terminal 7f connected to a power calculation circuit 15A (see FIG. 7).

The bridge control circuit 7C is similar to the bridge control circuit 7A (see FIG. 4) except that as shown in FIG. 10, the output terminal 7f of the bridge control circuit 7C is connected to the junction between the output terminal of a third comparator 204 and the collector of an NPN transistor 221 to receive a voltage G. Accordingly, in the embodiment of FIG. 10, the power calculation circuit 15A is informed of the voltage G.

Figure 11:
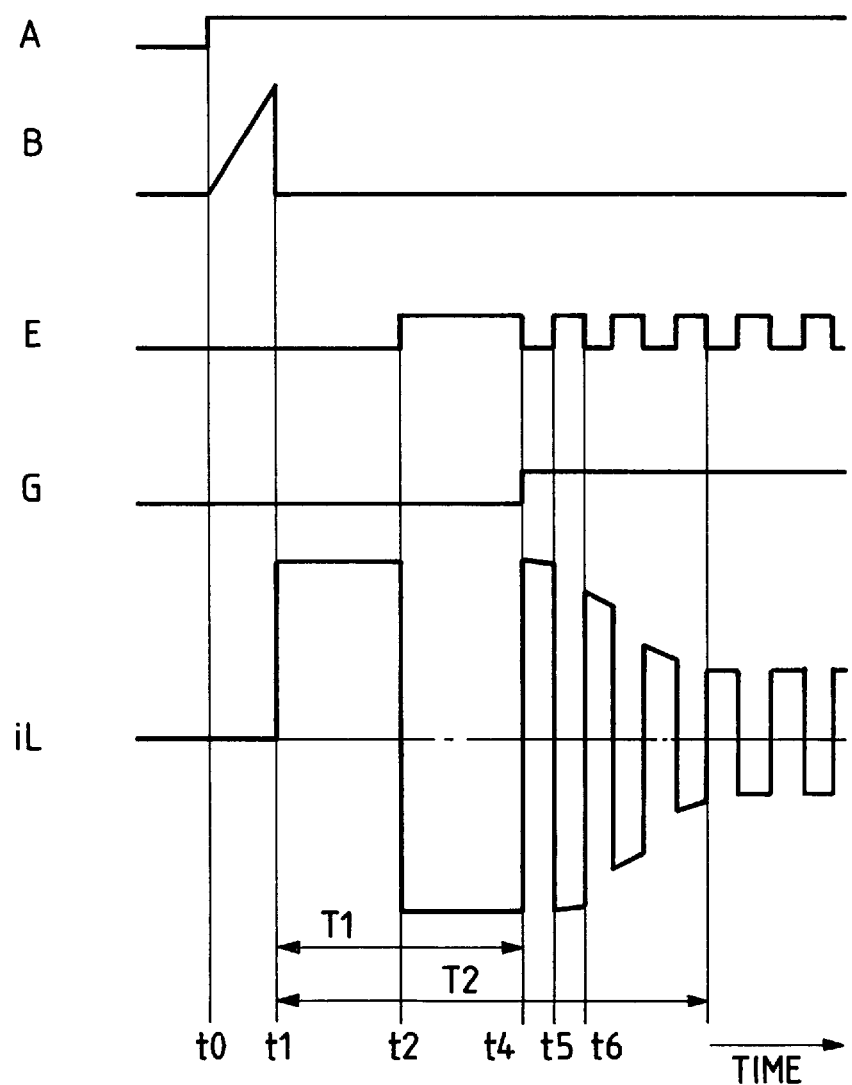
FIG. 11 is a time-domain diagram of various signals in the discharge-lamp lighting device of the fifth embodiment of this invention.

The power calculation circuit 15A controls a PWM circuit 13 (see FIG. 1) in response to the voltage G so that as shown in FIG. 11, during a time interval immediately after start of a high-voltage discharge lamp 2 (see FIG. 1), a lamp current iL will remain increased from a normal level when the voltage G continues to be relatively low. The increased lamp current iL facilitates heating of electrodes of the discharge lamp 2 to an adequately high temperature. Accordingly, it is possible to stably start the discharge lamp 2.

With reference to FIG. 11, the discharge lamp 2 remains supplied with the increased current iL for a time interval T2. A delay or a time lag in the control by the power calculation circuit 15A causes the time interval T2 to be longer than the time length T1 of a first cycle of the lamp current iL. In this way, the time interval T2 of the supply of the increased current to the discharge lamp 2 is extended by using the time lag in the control by the power calculation circuit 15A.

What is claimed is:

1. A lighting device for a discharge lamp, comprising:

a starting switch movable into an on position;

first means connected to the starting switch for feeding an alternating current of a variable frequency to the discharge lamp after activation of the discharge lamp; and second means connected to the first means for increasing the frequency of the alternating current (in accordance with lapse of time) over an interval of time during which the discharge lamp remains activated.

2. A lighting device as recited in claim 1, further comprising third means for sensing a lamp current which flows through the discharge lamp, and fourth means connected to the first means and the third means for controlling the frequency of the alternating current in response to the lamp current sensed by the third means.

3. A lighting device for a discharge lamp, comprising:

a power supplying circuit that supplies electric power to the discharge lamp;

a current detecting circuit that detects a lamp current flowing through the discharge lamp; and a control circuit that:

(a) enables the power supplying circuit to supply a first alternating-current electric power to the discharge lamp during a time interval immediately after activation of the discharge lamp, (b) shortens the time interval as a magnitude of the lamp current detected by the current detecting circuit increases, and (c) enables the power supplying circuit to supply a second alternating-current electric power to the discharge lamp after the time interval elapses;

wherein the second alternating-current electric power has a frequency higher than a frequency of the first alternating-current electric power.

4. A lighting device as recited in claim 3, wherein the control circuit is operative to adjust durations where the power supplying circuit supplies electric powers of like polarity to the discharge lamp in accordance with a value of the lamp current during the time interval.

5. A lighting device as recited in claim 4, wherein the control circuit is operative to adjust a ratio between supply times that the power supplying circuit supplies a positive electric power and a negative electric power in the time interval so as to substantially equalize values of a positive portion and a negative portion of the lamp current during the time interval.

6. A lighting device as recited in claim 4, wherein the control circuit includes:

a capacitor, and a current controlling circuit that charges and discharges the capacitor with currents depending on the lamp current, the control circuit being operative, immediately after activation of the discharge lamp, to charge the capacitor from a first predetermined voltage to a second predetermined voltage with a charging current depending on the lamp current, the control circuit being operative, while the capacitor is being charged, to supply one of a positive electric power and a negative electric power to the discharge lamp, the control circuit being operative, after the capacitor is charged to the second predetermined voltage, to enable the capacitor to be discharged to the first predetermined voltage with a discharging current depending on the lamp current, and the control circuit being operative, while the capacitor is being discharged, to supply the other of the positive electric power and the negative electric power to the discharge lamp.

7. A lighting device as recited in claim 6, wherein the control circuit includes a current increasing circuit that increases the charging and discharging currents with respect to the capacitor after the time interval elapses.

8. A lighting device as recited in claim 3, wherein the control circuit includes a lamp current increasing circuit that increases the lamp current during the time interval.

9. A lighting device as recited in claim 4, wherein the value of the lamp current is based on a product of a magnitude and a duration of the lamp current.

10. A lighting device as recited in claim 5, wherein the values of the positive and negative portions of the lamp current are based on a product of a magnitude and a duration of the lamp current during the positive and negative portions.

* * * * *